US010124996B2

(12) United States Patent
Keegan et al.

(10) Patent No.: US 10,124,996 B2
(45) Date of Patent: Nov. 13, 2018

(54) ELECTRONIC MODULE REMOVAL AND INSERTION CART

(71) Applicant: ROCKWELL AUTOMATION TECHNOLOGIES, INC., Mayfield Heights, OH (US)

(72) Inventors: Jeremy J. Keegan, Kewaskum, WI (US); Joseph N. Heinrich, Milwaukee, WI (US); Bruce W. Weiss, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 28 days.

(21) Appl. No.: 15/342,521

(22) Filed: Nov. 3, 2016

(65) Prior Publication Data

US 2018/0118535 A1    May 3, 2018

(51) Int. Cl.
| | | |
|---|---|---|
| B66F 9/06 | (2006.01) | |
| B66F 3/08 | (2006.01) | |
| B62B 3/02 | (2006.01) | |
| B62B 3/04 | (2006.01) | |
| B60P 1/52 | (2006.01) | |

(52) U.S. Cl.
CPC ........ B66F 3/08 (2013.01); B60P 1/52 (2013.01); B62B 3/022 (2013.01); B62B 3/04 (2013.01); B66F 9/06 (2013.01); *B62B 2203/74* (2013.01); *B62B 2205/20* (2013.01)

(58) Field of Classification Search
CPC .. B62B 3/022; B62B 3/04; B62B 3/06; B62B 3/0625; B62B 3/0643; B62B 3/0606; B62B 3/0618; B62B 3/002; B62B 2205/00; B62B 2203/073; B66F 9/14; B66F 9/122; B66F 9/18; B66F 9/165; H02B 3/00; H02B 11/127
USPC ....... 414/628, 629, 630–634, 444, 541, 663, 414/664, 660, 661, 619, 671, 672; 280/47.34, 47.35, 79.2, 79.7, 35, 639, 641
See application file for complete search history.

(56) References Cited

U.S. PATENT DOCUMENTS

| | | | | |
|---|---|---|---|---|
| 1,903,431 | A * | 4/1933 | Abbe | ............... B66F 9/06 220/8 |
| 4,265,583 | A * | 5/1981 | Baird | ............... B66F 9/12 414/246 |
| 5,330,213 | A * | 7/1994 | Peruso | ............... B60S 9/18 280/43.2 |
| 5,403,024 | A * | 4/1995 | Frketic | ............... B62B 3/06 280/43.12 |
| 6,530,740 | B2 * | 3/2003 | Kim | ............... B62B 1/002 180/251 |

(Continued)

*Primary Examiner* — Kaitlin S Joerger
(74) *Attorney, Agent, or Firm* — Fletcher Yoder, P.C.

(57) ABSTRACT

A cart is provided four extracting modular components from enclosures, and for inserting such components into enclosures. The cart may be specifically adapted for components of certain sizes and configurations. It may be used, for example, for extracting power electronic modular components from an electrical enclosure. The cart includes a support structure and an upright structure on which a carriage is movable. The carriage has elements that can extend below the modular component, to secure to the modular component, and to raise the modular component for extraction. Some or all of the interconnected elements of the cart may be foldable and collapsible for ease of storage and transport.

20 Claims, 6 Drawing Sheets

(56) References Cited

U.S. PATENT DOCUMENTS

| | | | | |
|---|---|---|---|---|
| 6,688,634 | B2* | 2/2004 | Noffsinger | B25H 3/06 |
| | | | | 280/47.19 |
| 6,827,540 | B2* | 12/2004 | Walker | H02B 3/00 |
| | | | | 414/281 |
| 7,588,404 | B2* | 9/2009 | Sonon | B65D 11/1833 |
| | | | | 414/277 |
| 8,657,310 | B2* | 2/2014 | Pan | H01L 21/6773 |
| | | | | 280/47.35 |
| 9,203,217 | B2* | 12/2015 | Takano | H05K 7/1432 |
| 9,362,723 | B2* | 6/2016 | Crooks | H02B 11/127 |
| 2005/0036865 | A1* | 2/2005 | Matter | B62B 3/04 |
| | | | | 414/490 |
| 2007/0116548 | A1* | 5/2007 | Cooper | B62B 3/06 |
| | | | | 414/619 |
| 2009/0129905 | A1* | 5/2009 | McIntosh | B62B 3/04 |
| | | | | 414/471 |
| 2011/0243696 | A1* | 10/2011 | DiBenedetto | B66F 9/06 |
| | | | | 414/490 |

\* cited by examiner

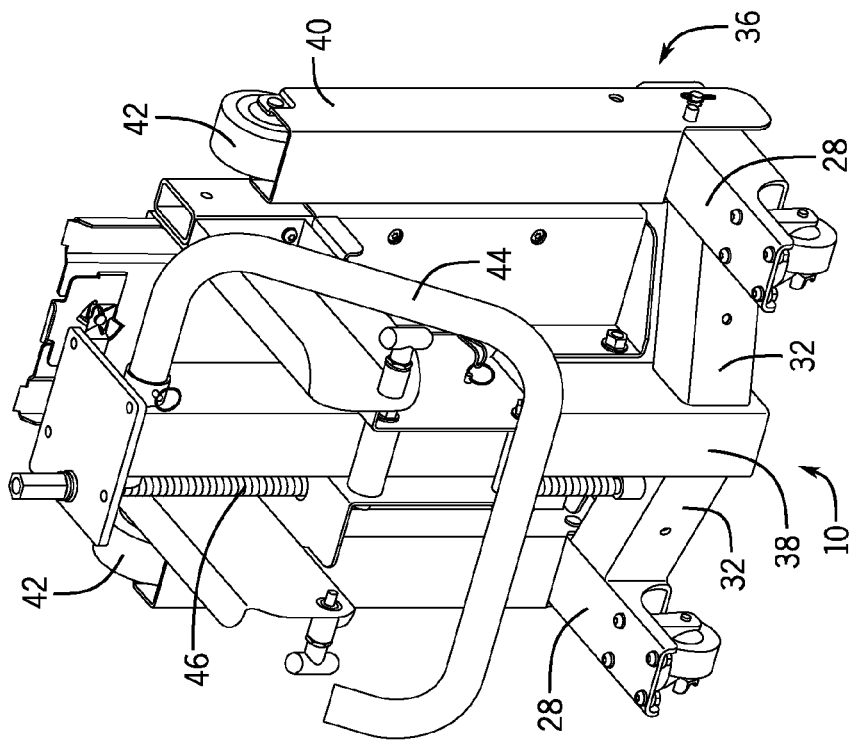
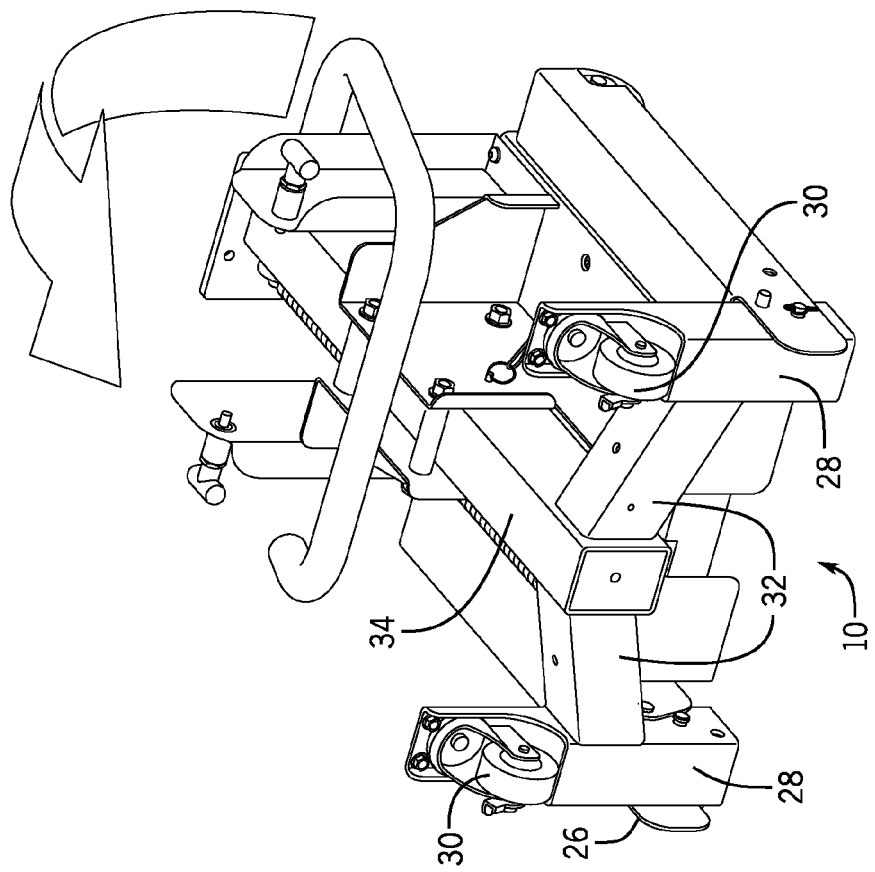
FIG. 3A
FIG. 3B

ELECTRONIC MODULE REMOVAL AND INSERTION CART

BACKGROUND

The present disclosure relates generally to devices for inserting and removing large, bulky or heavy modules into electrical enclosures.

In the field of electrical and electronic systems, components and modules comprising electrical and electronic elements may be small and light enough for easy manual manipulation. In some instances, however, modules are much larger, unwieldy, or heavy, making them difficult to manually insert into and removed from enclosures. In their original manufacture, the modules may be assembled with the help of positioning equipment. In the field, however, locating the modules within electrical enclosures is much more difficult, as is their extraction, such as for servicing, replacement, and so forth.

One type of electrical device in which these difficulties are encountered is large motor drives. Such drives may comprise sizable assemblies of electrical, electronic, and power electronic components that may be housed in an enclosure in which they reside during the vast majority of their useful lives. However, for initial assembly, as well as for servicing, it may be necessary to remove these components in a controlled way. At present, there is little or no practical approach to inserting and removing this type of module from electrical enclosures. Further improvements are therefore needed.

BRIEF DESCRIPTION

The present disclosure relates to a cart designed to respond to such needs. The cart may be specifically adapted for module configurations, but may be easily configured for other installations and positioning needs. The cart may be designed with one or multiple folding elements, making it easy to transport, deploy, utilize, then re-collapse for later use.

In accordance with a first aspect of the disclosure, a cart comprises a framework having an upstanding assembly and a base assembly, the base assembly including wheeled, spaced apart elements supporting the cart and allowing fore and aft motion of the cart. A carriage assembly spans a space between the extensions and movable to desired elevations, and a bridge span is extendable and retractable with respect to the carriage assembly to be positioned beneath a modular component in an enclosure. A securement structure is configured to attach the cart to the modular component. At least the bridge span is mounted to be raised to support the modular component to selectively withdraw the modular component from the enclosure and to insert the modular component into the enclosure by rolling movement of the cart with respect to the enclosure.

In accordance with another aspect, a cart comprises a framework having an upstanding assembly and a base assembly, the base assembly including wheeled, spaced apart elements supporting the cart and allowing fore and aft motion of the cart. A carriage assembly spans a space between the extensions and movable to desired elevations, and a securement structure is configured to attach the cart to a modular component. The carriage assembly is mounted to be raised to support the modular component to selectively withdraw the modular component from an enclosure and to insert the modular component into the enclosure by rolling movement of the cart with respect to the enclosure. The carriage assembly is foldable with respect to the upstanding assembly for portability and storage of the cart.

In accordance with yet another aspect, a cart comprises a framework having an upstanding assembly and a base assembly, the base assembly including wheeled, spaced apart elements supporting the cart and allowing fore and aft motion of the cart, and a carriage assembly spanning a space between the extensions and movable to desired elevations. The carriage assembly is mounted to be raised to support a modular component to selectively withdraw the modular component from an enclosure and to insert the modular component into the enclosure by rolling movement of the cart with respect to the enclosure. The carriage assembly is foldable with respect to the upstanding assembly for portability and storage of the cart. The upstanding assembly is foldable with respect to the base assembly. The base assembly comprises a pair of rear wheeled supports and a pair of forward wheeled extensions, and wherein the forward extensions are foldable with respect to the rear supports. The cart comprises a foldable handle foldable with respect to the upstanding assembly.

DRAWINGS

These and other features, aspects, and advantages of the present invention will become better understood when the following detailed description is read with reference to the accompanying drawings in which like characters represent like parts throughout the drawings, wherein:

FIG. 3A is a perspective view of the cart in a collapsed or folded configuration;

FIG. 3B is a perspective view of the same cart positioned for unfolding;

DETAILED DESCRIPTION

Figure 1:
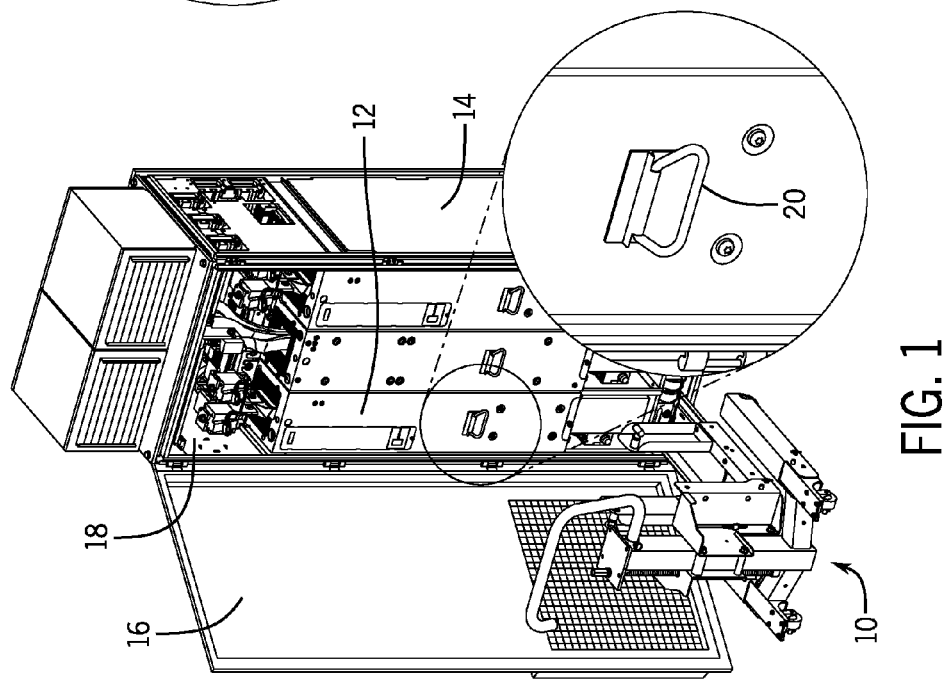
FIG. 1 is a perspective view of an exemplary cart positioned in front of an electrical enclosure with a component module to be removed.

Turning now to the drawings, and referring first to FIG. 1, a cart 10 is illustrated for removing a modular component 12 from an electrical enclosure 14. The cart 10 is illustrated as positioned in front of the enclosure with the door 16 opened to expose three similar modular components positioned within. The cart, which is described in greater detail below, is designed to be folded or collapsed for ease of transport and storage, and then unfolded and wheeled into position so as to insert a support beneath the modular component for raising it and sliding it out of position from the enclosure. Before removal, the modular component 12, and any other components in the enclosure, are fully positioned within an interior space 18, typically so that the door can remain closed during use. In this case, the component may be equipped with one or more features to aid and withdrawing it, positioning it, or otherwise manipulating it into, within, and out of the enclosure, such as a handle 20 illustrated in the inset of FIG. 1.

Figure 2:
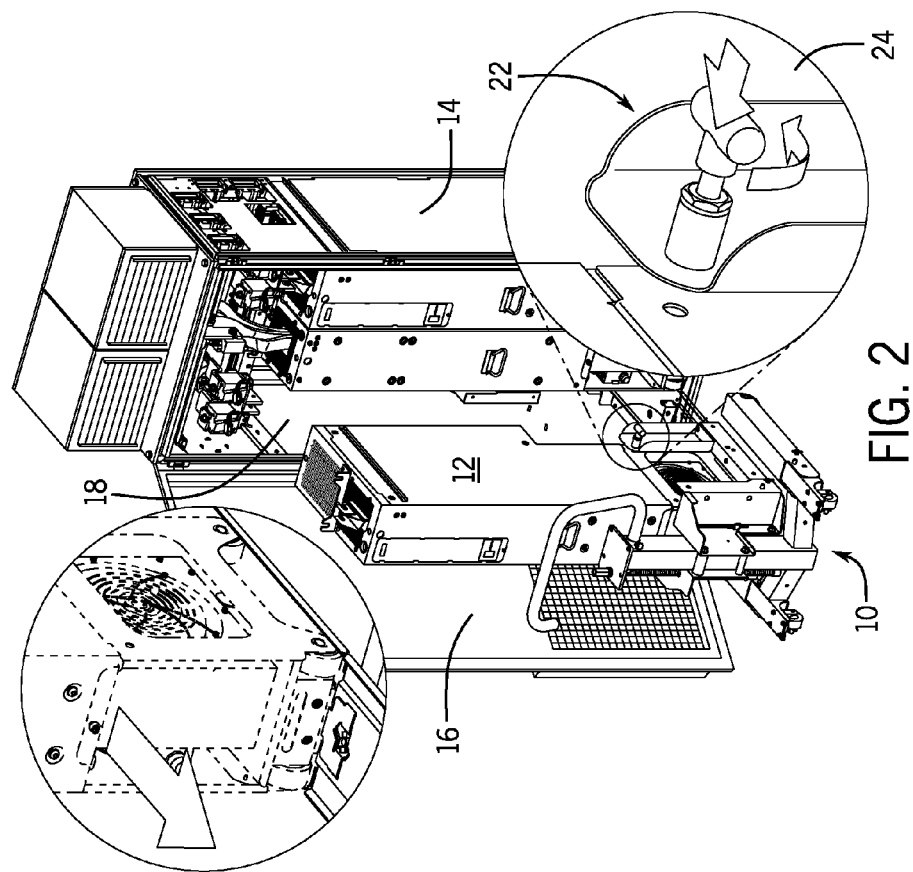
FIG. 2 is a similar perspective view of the cart removing one of the components.

FIG. 2 illustrates the same arrangement with the modular component partially removed. The component can be seen supported on the cart and withdrawn from the enclosure, with the cart raising the component slightly so that it can be wheeled back from the enclosure. As described in greater detail below, one or more securement structures 22 may be provided for stabilizing the component. These may include, for example screws 24, pins, brackets, and so forth.

Figure 3C:
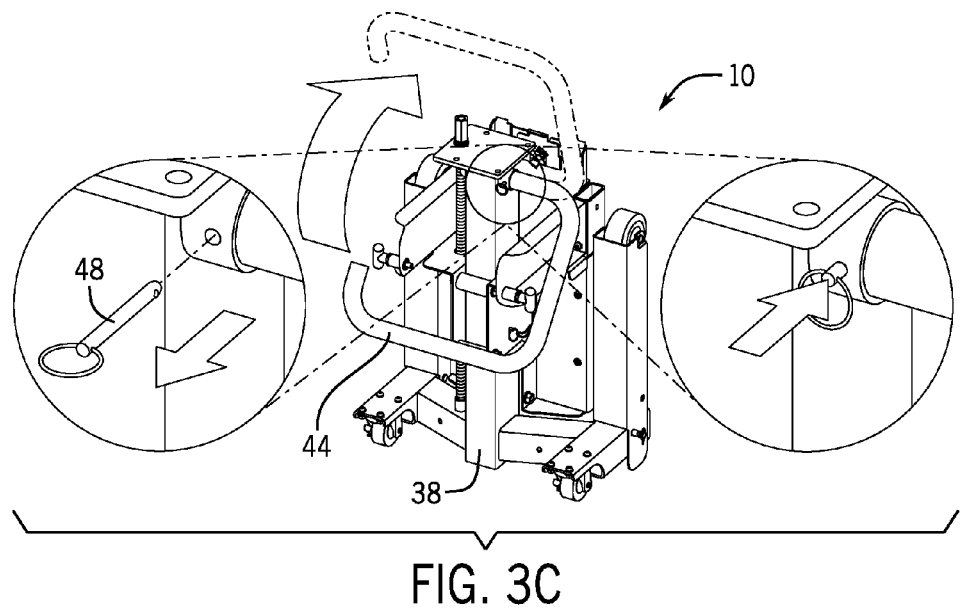
FIG. 3C is a perspective view of the same cart with a handle being unfolded.

FIGS. 3A through 3H represent the same cart in various configurations for deployment and use. In the illustrated embodiment the cart is specifically adapted for removing modular components of a particular type from an electrical enclosure. In the illustrated example, the modular components within the enclosure form a motor drive that is adapted to receive three-phase electrical power from a source, and to convert the power to a form required for driving an electric motor at desired speeds. Multiple modular components may be located in the enclosure, and during normal use do not require removal or servicing. For that reason, between uses, the cart may be adapted for collapsing and storage. To aid in are storing and transporting the cart, it may be folded in one or multiple ways. In the illustration of FIG. 3A, for example, shows the cart in the fully collapsed position.

In general, the cart 10 comprises a framework 26 having rear supports 28 which are supported by wheels 30. Beams 32 connect the rear support 28 to an upstanding assembly 34. In the orientation shown in FIG. 3A, however, the cart has been folded completely and laid down so that the rear supports 28 are generally vertically oriented, while the upstanding assembly 34 is laid down. FIG. 3B shows the same cart, still folded, but positioned in an upright orientation. Here, the rear supports 28 can be seen in their use position, with a vertical post 38 of the outstanding assembly 34 positioned generally vertically. A base assembly 36 is formed by the rear supports 28 and forward extensions 40. The forward extensions also are supported by wheels 42. A handle 44 may be included in the assembly, and in the illustrated embodiment may be folded into the collapsed position shown. Also visible in FIG. 3B is a screw arrangement that is used to raise and lower the support elements of the cart, and with these the modular component when loaded on the cart. More will be said about the manipulation of the movable components below.

FIG. 3C and its inserts illustrate unfolding of the cart from the position shown in FIG. 3. A pin 48 is removed from aligned holes in the handle 44 and its support to allow the handle to be rotated or pivoted into its use position. Thereafter, the pin may be reinserted as illustrated in the detail insert of FIG. 3C to hold the handle in place, allowing the cart to be easily rolled into position, and once modular component is secured to the cart and removed from the enclosure, to any desired location. It may be noted that the wheels of the cart may be in a fixed orientation, or may castor to allow for moving the cart and component around corners, along narrow aisles, and so forth. In the illustrated embodiment, for example, wheels 30 are fixed, while wheels 42 may castor.

Figure 3D:
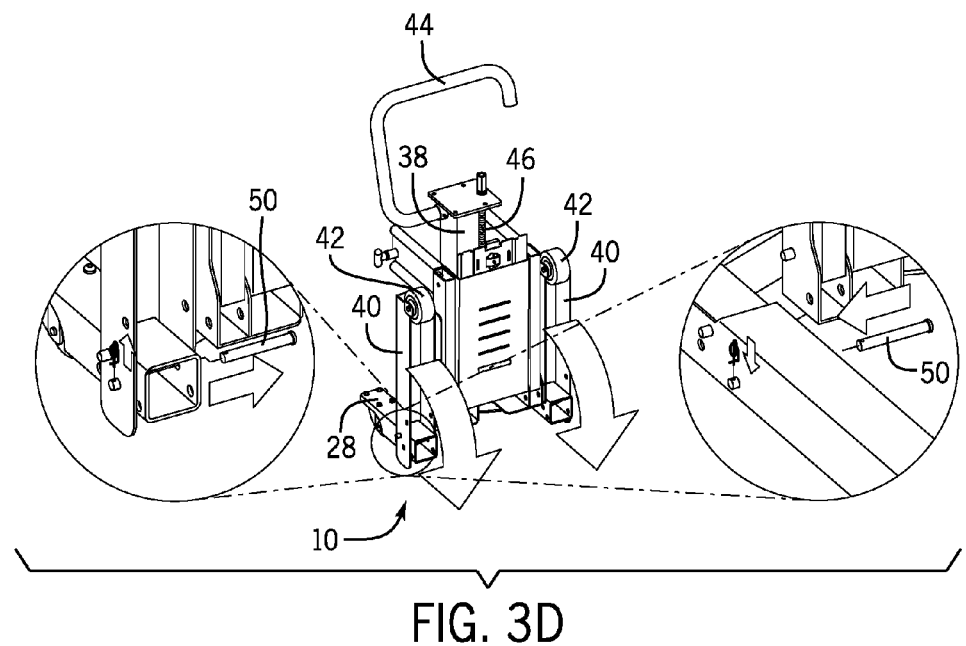
FIG. 3D is a perspective view of the same cart shown in a position for unfolding base supports.

FIG. 3D illustrates further unfolding of the cart. Here, pins 50 are removed from aligned holes in the rear supports and the forward extensions to allow the forward extensions to be rotated downwardly into their use positions as illustrated by the arrows in FIG. 3D. Pins may be provided on one or both sides of the assembly for this purpose. Once the forward extensions have been rotated to their use positions, the pins may be reinserted to lock them in place.

Figure 3E:
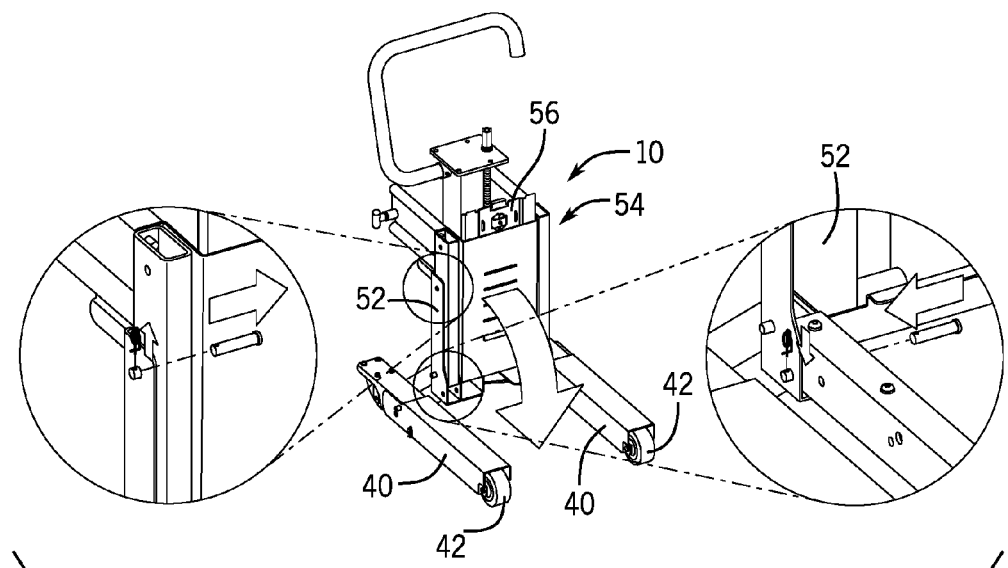
FIG. 3E is a perspective view of the same cart illustrating unfolding of elements used to support the component.

FIG. 3E illustrates the cart, and lowering or unfolding of a carriage assembly 54 on a carriage trolley 52. The carriage assembly 54 is locked in the folded position by pins on one or both sides. These pins may be removed to fold the carriage assembly downwardly between the forward extensions as illustrated by the arrow in FIG. 3E. Thereafter, the pins may be replaced into aligned holes to lock the carriage assembly into place. Although positioned between the forward extensions, the carriage assembly is supported by the vertical post described above and by the carriage trolley that allows movement of the carriage assembly along the post as the screw is manipulated by an operator. Also visible in FIG. 3E is a bridge span 56 that is carried by the carriage assembly and may be extended and retracted as described below.

Figure 3F:
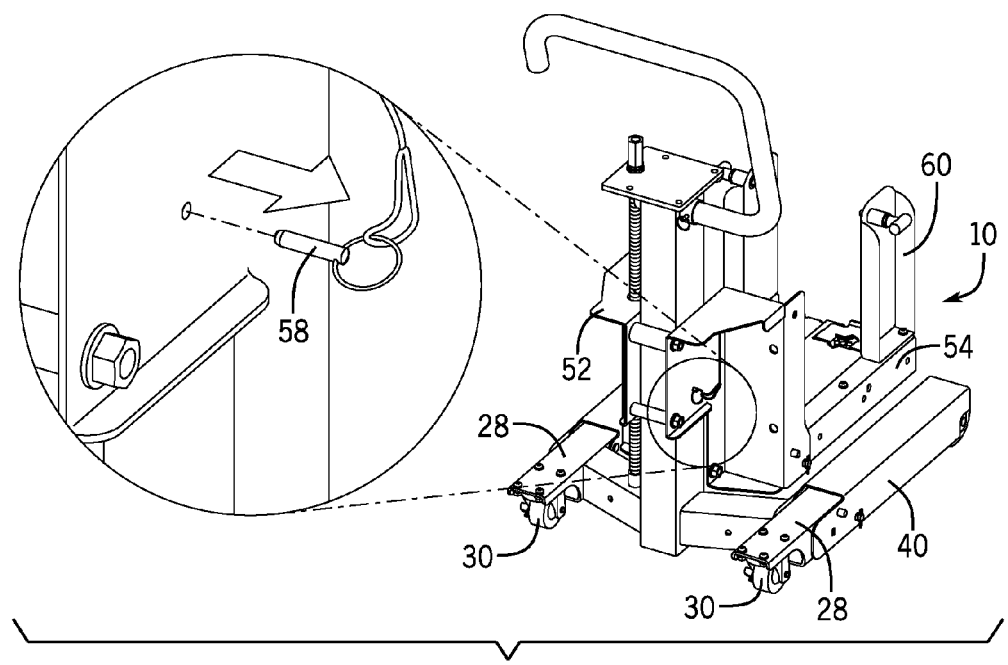
FIG. 3F is a perspective view of the same cart showing the locking of the component supporting elements.
Figure 3G:
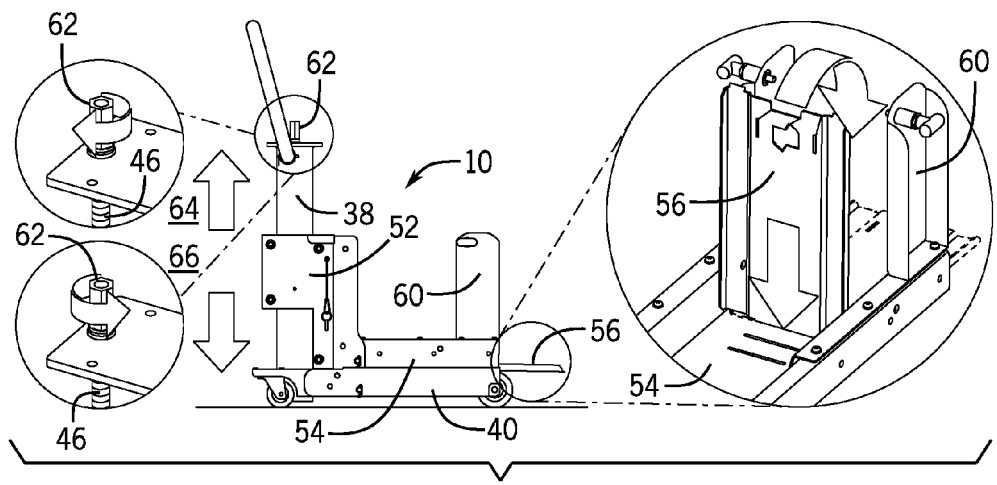
FIG. 3G is are side and perspective views of the same cart showing extension of component support elements.

FIG. 3F illustrates a final step in readying the cart for use. In the illustrated embodiment, the carriage trolley 52 may move upwardly and downwardly along the post during use. For transport and storage, this carriage trolley is locked into place by a pin 58. Removal of this pin allows for movement of the trolley upwardly and downwardly. The trolley, in turn, carries the carriage assembly 54. As can be seen in FIG. 3F, the carriage trolley as an extension that interfaces with the screw 46 to allow for raising and lowering of the carriage trolley. In this implementation the screw may be journaled near its upper and lower ends, and threadingly engage the extension of the carriage trolley so as to cause movement of the trolley along the screw as it is turned. The carriage trolley is mounted around the vertical post to allow it to be thus raised and lowered, while always being supported by the vertical post against fore and aft movement, or lateral tipping. In this way, the vertical post maintains alignment of the carriage trolley while permitting its movement, and supports the carriage trolley in a cantilevered manner during use.

FIG. 3E illustrates how the bridge span 56 is folded downwardly for use, and the entire carriage trolley, carriage assembly and bridge span are raised and lowered during use. In particular, in the right hand inset of FIG. 3E, the bridge span 56 is shown being lowered or pivoted into a generally horizontal orientation. A stabilizing upright 60 may be provided on each side of the carriage assembly, beside the bridge span, to aid in a stabilizing and securing the modular component when it is positioned on the cart. The central view of FIG. 3 illustrates the bridge span 56 extended and its working position. As noted above, the cart comprises a screw 46 that allows for raising and lowering of the carrier trolley, the carriage assembly, and the bridge span, which are all interconnected. The screw 46 may terminate in a hex head 62 so that a wrench or a specially designed crank or tool can rotate the screw to raise and lower the carriage assembly.

It may also be noted that in FIG. 3E a locking tab may be seen in the right-hand inset image. This locking tab forms part of the "securement structure" in the illustrated embodiment, and serves to avoid rotation of the modular component (e.g., flipping forward towards the entrance of the cart).

Figure 3H:
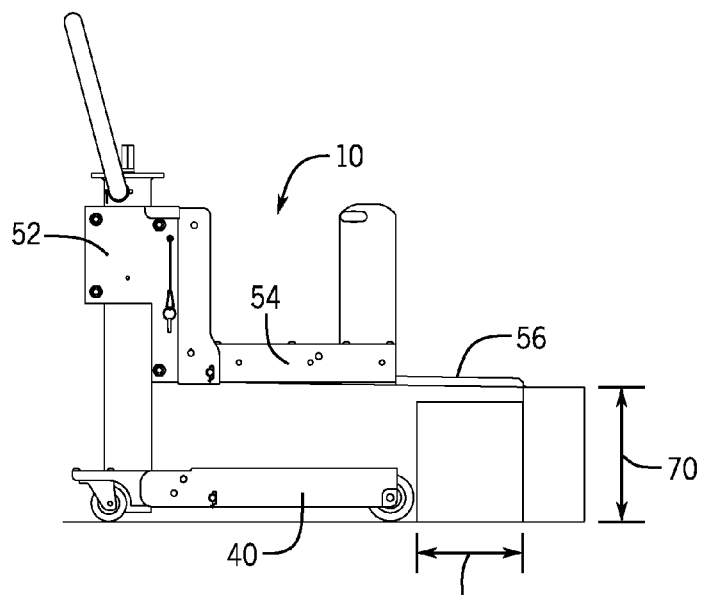
FIG. 3H is a side view of the cart showing height and extension dimensions.

FIG. 3H shows the carriage raised somewhat by manipulation of the screw. Here again, any physical configurations and dimensions may be used, depending upon the structure and configuration of the modular components to be manipulated. In the illustration of FIG. 3H, the bridge span 56 is slidably mounted on the carriage assembly so that it can be extended a distance 68 in front of the wheels of the forward extensions. This allows the cart to be rolled into place just in front of the enclosure, while extending its reach outwardly below the modular component by the bridge span extension. Also, by manipulating the screw, thereby raising and lowering the carriage assembly and bridge span with the carriage trolley, the movable elements of the cart may be lowered between the forward extensions as illustrated in the foregoing figures, or raised to an upper position by a distance of travel 70 shown in FIG. 3H, or to any height therebetween.

Figure 4:
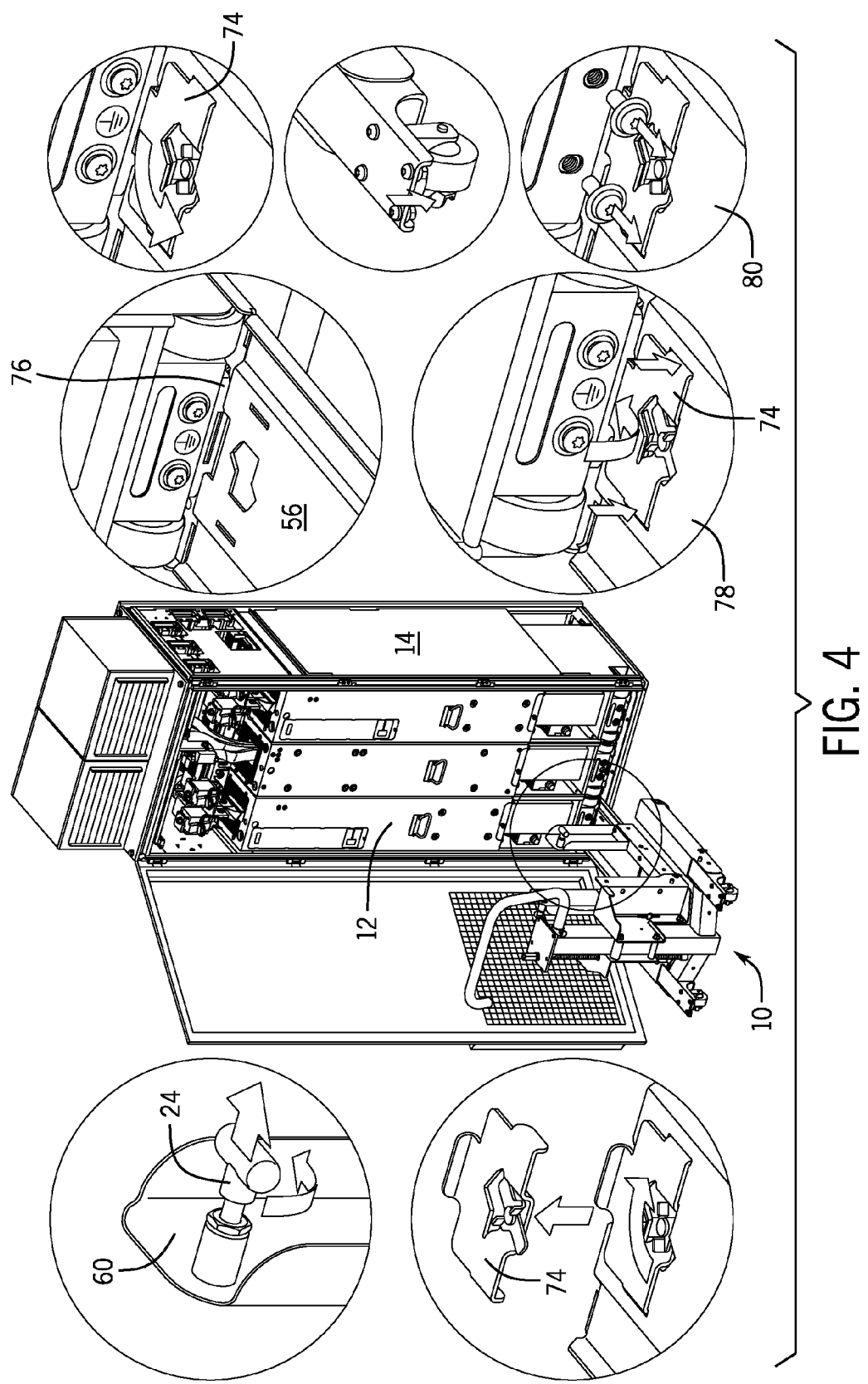
FIG. 4 is a perspective view of the cart with insets to show how the component may be locked in place or insertion and removal.

FIG. 4 shows the cart rolled into place in front of the modular component 12 and positioned for raising and removing the component from the enclosure. In the illustrated embodiment, a tie-in plate 74 is provided that can be positioned at the front of the bridge span to hold a front structure or lip of the component. As noted above, and as shown again in FIG. 4, other securement structures, such as a screw 24 may be provided to engage the component and to hold it securely on the cart. In the inset of FIG. 4, this screw is shown as being secured to the upright 60 on one side of the cart. Such securement structures may be provided in multiple locations, such as on opposite sides of the cart. In the embodiment illustrated in FIG. 4, and as best shown in the insets to the right, the bridge span may be slid into a space 76 below the modular component by extension of the bridge span and advancing of the cart into place. Thereafter, the tie-in plate may be rotated into a locking orientation to interface with the floor of the component. The component may be thereby locked to the cart as indicated by reference number 80 in FIG. 4. Once secured to the cart, the component may be lifted somewhat by manipulation of the screw and raising of the carriage trolley, carriage assembly and bridge span. The entire cart and component may then be backed out of the enclosure and the component may be serviced or moved to a desired location. Locks on one or more of the wheels may also be are provided to reduce rolling of the cart during extraction of the component, as shown in the middle inset to the right in FIG. 4.

It may be noted that the "securement structures" described above may include any number of features that may avoid or reduce the likelihood of the modular component moving on or from the cart. In the illustrated embodiment these include, for example, the tab shown in FIG. 3E, one or more screws or fasteners, such as screw 24, the tie-in plate 74, one or more upright members (e.g., uprights 60), and so forth.

It may also be noted that, as mentioned, the presently contemplated embodiment provides for collapsing a number of the elements of the cart, different configurations may be envisioned that enable the cart to be reduced in size and weight by such folding or collapsing, while enhancing mobility when unfolded. For example, the illustrated cart is designed for permit collapsing to fit into a vehicle trunk, with final envelope dimensions of approximately 39"×38"×21". By the use of fixed and castoring wheels, excellent control may be maintained, while allowing movement, loaded and unloaded, through 36" wide aisles including 90 degree turns.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A cart comprising:
   a framework having an upstanding assembly and a base assembly, the base assembly including wheeled, spaced apart elements supporting the cart and allowing fore and aft motion of the cart;
   a carriage assembly spanning a space and movable to desired elevations;
   a bridge span extendable and retractable with respect to the carriage assembly to be positioned beneath a modular component in an enclosure; and
   a securement structure disposed on the bridge span and configured to attach the cart to the modular component when the bridge span is in an extended position;
   wherein at least the bridge span is mounted to be raised to support the modular component to selectively withdraw the modular component from the enclosure and to insert the modular component into the enclosure by rolling movement of the cart with respect to the enclosure.

2. The cart of claim 1, wherein the bridge span is mounted to the carriage assembly to be raised upon raising of the carriage assembly.

3. The cart of claim 2, comprising a screw for raising and lowering the carriage assembly and bridge span.

4. The cart of claim 1, wherein the upstanding assembly comprises a generally vertical post on which the carriage assembly is mounted.

5. The cart of claim 1, wherein the carriage assembly comprises at least one upright for avoiding tipping of the modular component.

6. The cart of claim 5, wherein at least one securement structure is provided on the at least one upright.

7. The cart of claim 1, wherein the upstanding assembly is foldable with respect to the base assembly.

8. The cart of claim 1, wherein the base assembly comprises a pair of rear wheeled supports and a pair of forward wheeled extensions, and wherein the forward extensions are foldable with respect to the rear supports.

9. The cart of claim 1, comprising a foldable handle secured to the upstanding assembly.

10. A cart comprising:
    a framework having an upstanding assembly and a base assembly, the base assembly including wheeled, spaced apart elements supporting the cart and allowing fore and aft motion of the cart;
    a carriage assembly spanning a space and movable to desired elevations; and
    a securement structure disposed on the bridge span and configured to attach the cart to a modular component when the bridge span is in an extended position;
    wherein the carriage assembly is mounted to be raised to support the modular component to selectively withdraw the modular component from an enclosure and to insert the modular component into the enclosure by rolling movement of the cart with respect to the enclosure; and
    wherein the carriage assembly is foldable with respect to the upstanding assembly for portability and storage of the cart.

11. The cart of claim 10, comprising a bridge span extendable and retractable with respect to the carriage assembly to be positioned beneath a modular component in an enclosure.

12. The cart of claim 11, wherein the bridge span is mounted to the carriage assembly to be raised upon raising of the carriage assembly.

13. The cart of claim 12, comprising a screw for raising and lowering the carriage assembly and bridge span.

14. The cart of claim 10, wherein the upstanding assembly is foldable with respect to the base assembly.

15. The cart of claim 10, wherein the base assembly comprises a pair of rear wheeled supports and a pair of forward wheeled extensions, and wherein the forward extensions are foldable with respect to the rear supports.

16. The cart of claim 10, comprising a foldable handle secured to the upstanding assembly.

17. A cart comprising:
- a framework having an upstanding assembly and a base assembly, the base assembly including wheeled, spaced apart elements supporting the cart and allowing fore and aft motion of the cart;
- a carriage assembly spanning a space and movable to desired elevations; and
- a bridge span extendable and retractable with respect to the carriage assembly to be positioned beneath a modular component in an enclosure, the bridge span comprising a securement structure disposed on the bridge span and configured to attach the cart to a modular component when the bridge span is in an extended position;
- wherein the carriage assembly is mounted to be raised to support a modular component to selectively withdraw the modular component from an enclosure and to insert the modular component into the enclosure by rolling movement of the cart with respect to the enclosure; and
- wherein the carriage assembly is foldable with respect to the upstanding assembly for portability and storage of the cart; and
- wherein the upstanding assembly is foldable with respect to the base assembly; and
- wherein the base assembly comprises a pair of rear wheeled supports and a pair of forward wheeled extensions, and wherein the forward extensions are foldable with respect to the rear supports; and
- wherein the cart comprises a foldable handle foldable with respect to the upstanding assembly.

18. The cart of claim 17, wherein the securement structure comprises a tie-in plate that holds a front structure of the modular component.

19. The cart of claim 18, wherein the bridge span is mounted to the carriage assembly to be raised upon raising of the carriage assembly.

20. The cart of claim 19, comprising a screw for raising and lowering the carriage assembly and bridge span.

\* \* \* \* \*